Feb. 16, 1965        H. L. JARMAN        3,169,280
              EXPANSIBLE HOUSE TRAILER
Filed Dec. 30, 1960                 3 Sheets-Sheet 1
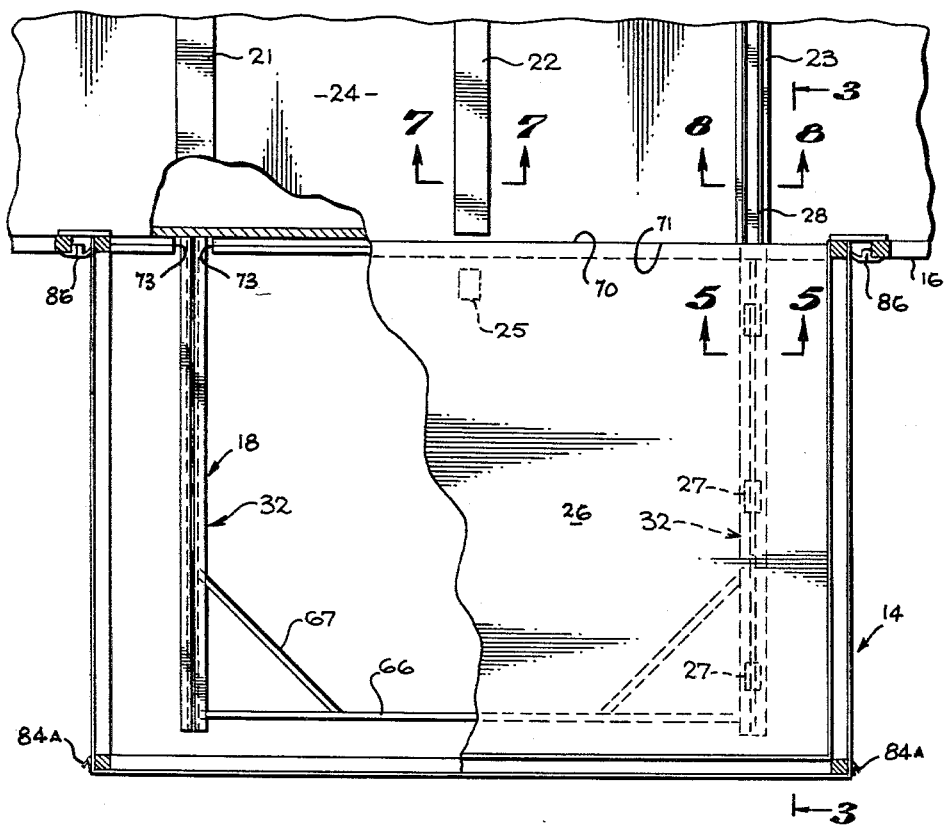
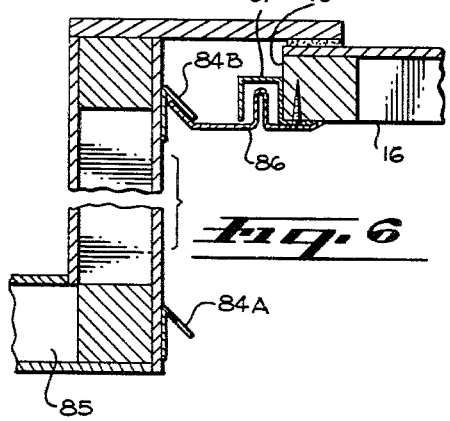
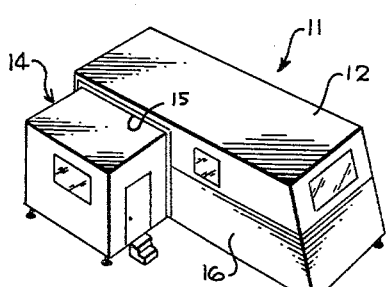
INVENTOR.
HARRY LEE JARMAN
BY
*Mason & Ihoham*
ATTORNEYS

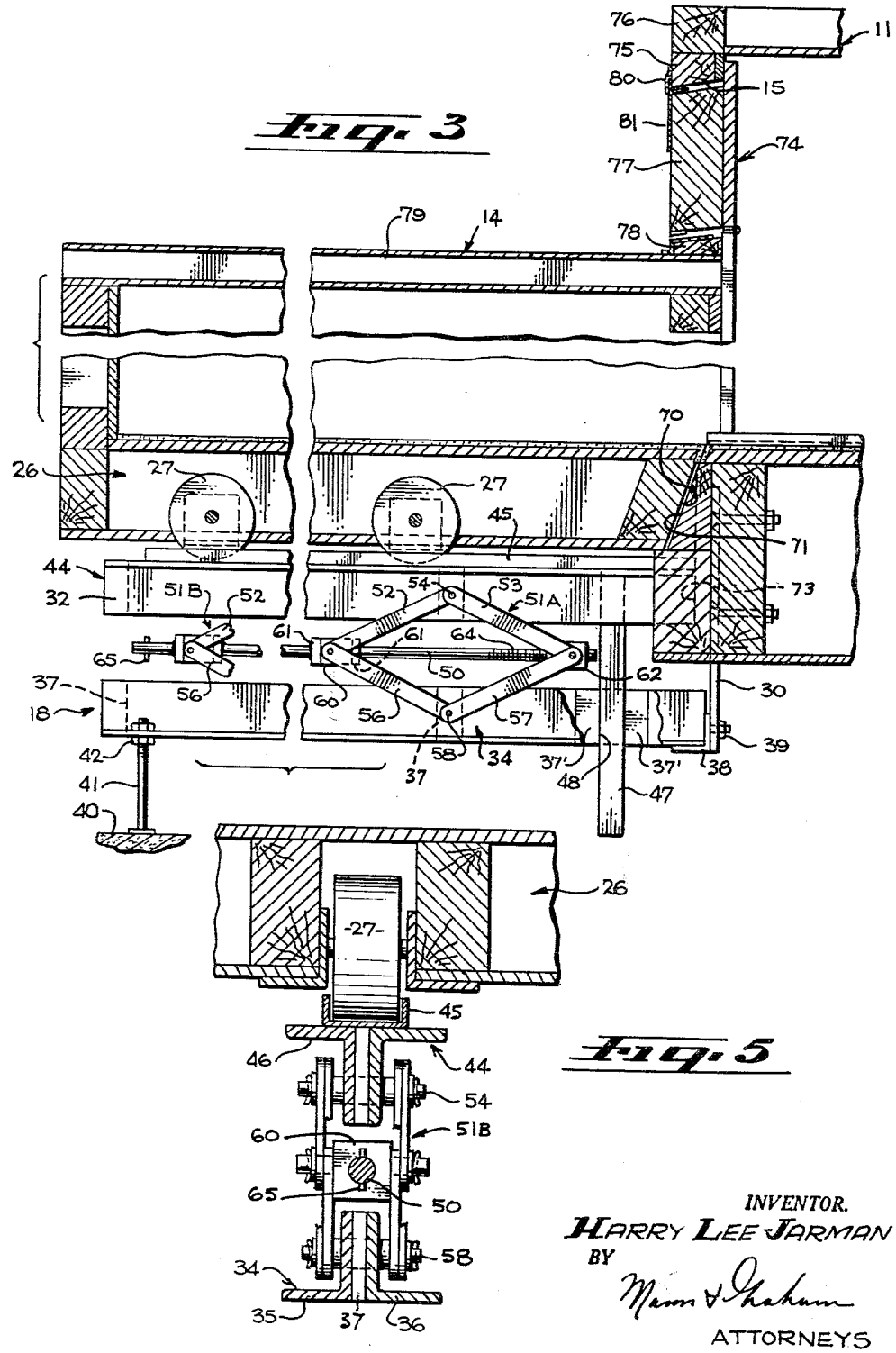

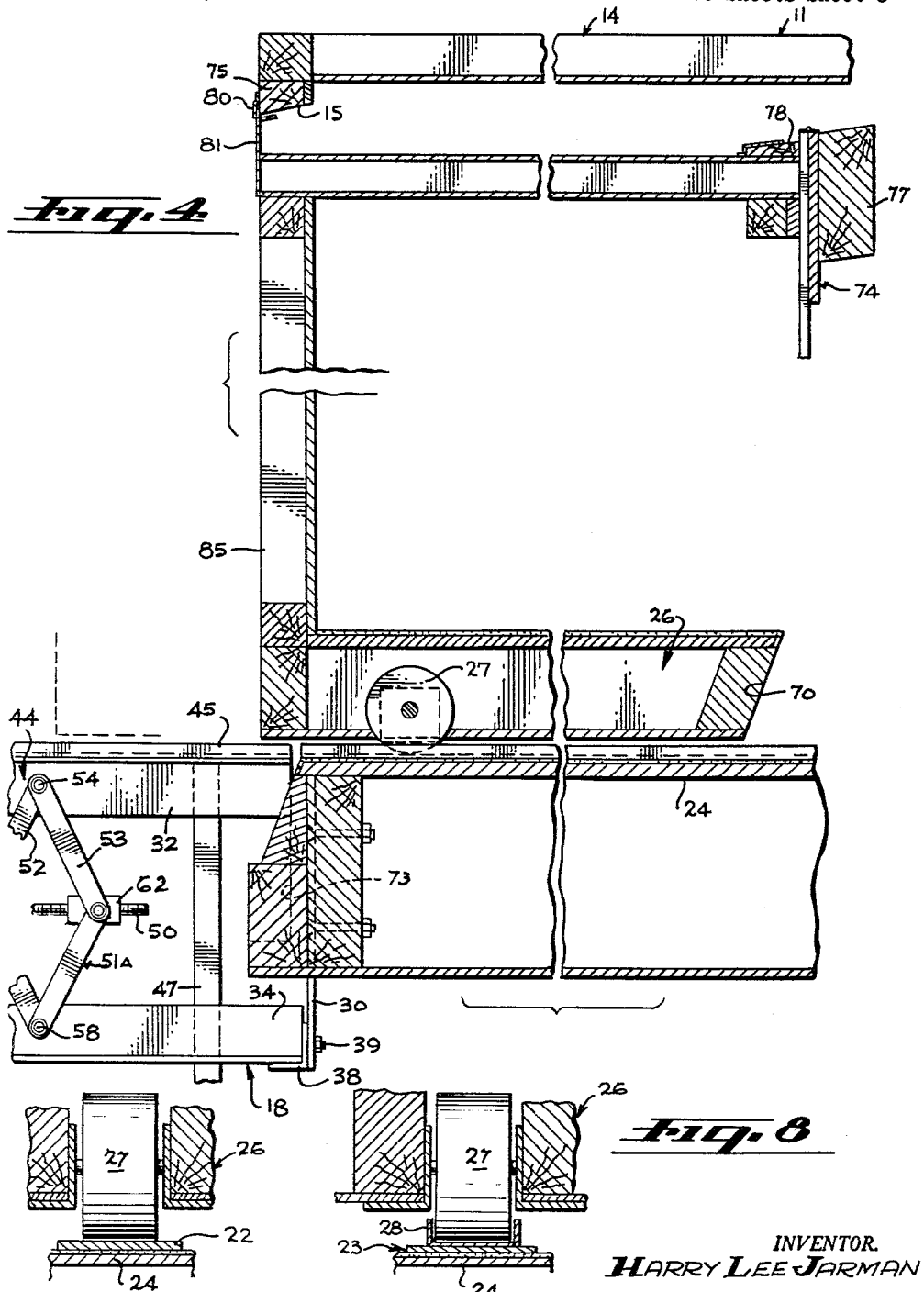

United States Patent Office 3,169,280
Patented Feb. 16, 1965

3,169,280
EXPANSIBLE HOUSE TRAILER
Harry Lee Jarman, Anaheim, Calif. (12121 Adrian St., Apt. A, Garden Grove, Calif.), assignor of one-third to Vloden N. Cardner, Fullerton, Calif.
Filed Dec. 30, 1960, Ser. No. 79,677
3 Claims. (Cl. 20—2)

This invention has to do with expansible house trailers embodying a movable room section which is telescoped within the main portion of the trailer and upon the floor thereof for transit but which can be fully extended, supported and then lowered to floor leveling condition to thereby provide more usable living and floor area when the trailer is parked for living.

An object of the invention is to provide a house trailer structure having telescoping sections with novel means for supporting a movable telescoping section in extended position and as it is moved to and from extended position.

Another object is to provide a novel house trailer construction which permits a movable telescoping section to travel into and over the floor of the main section of the trailer together with novel means for stopping and supporting the movable section exteriorly of the main section including means for slidably guiding and lowering the movable section after it has been fully extended for the purpose of then lowering its floor to the same level as the floor of the main section and flush therewith, the same means serving for raising the movable section to return it to an elevation where it can be rolled into the main section of the trailer and on the floor thereof.

A further object is to provide novel track means which can be detachably mounted and secured embodying novel means for vertically expanding and contracting the same.

A still further object is to provide constructions of the type indicated above which are easy to operate and make it possible for a single person to readily expand or contract the trailer.

Still another object is to provide a novel means for effecting a weather seal between the sections of the trailer whether the movable section is in extended or retracted position.

These and other objects will be apparent from the drawings wherein a preferred embodiment of the invention is shown and the following description. Referring to the drawings:

FIG. 1 is a perspective view of a house trailer having a telescoping room section shown in extended position;

FIG. 2 is a fragmentary sectional plan view, partially broken away, showing a portion of the interior of the main section of the trailer and showing the floor of the telescoping section and a portion of the supporting track;

FIG. 3 is a fragmentary sectional view on line 3—3 of FIG. 2, but on a larger scale;

FIG. 4 is a view in the same plane as FIG. 3 but showing the movable section in telescoped position;

FIG. 5 is a sectional view on line 5—5 of FIGS. 2 and 3;

FIG. 6 is a fragmentary sectional plan view showing the weather seal between the side walls of the main and telescoping section;

FIG. 7 is an enlarged fragmentary sectional view on line 7—7 of FIG. 2, and

FIG. 8 is an enlarged fragmentary sectional view on line 8—8 of FIG. 2.

The invention will be particularly shown and described with reference to a house trailer, however, the construction is suitable for other structures wherever a relatively large framework or section is telescopically related to another section. Numeral 11 generally designates a house trailer embodying a main or stationary enclosed body section 12 and a relatively movable or telescoping extension body room section 14 which is shown fully in FIG. 1 in extended and engaged position, it being movable through an opening 15 in the side wall 16 of the main section of the trailer until its two vertically disposed and outwardly extending stop flanges which are suitably secured to the inner side edges of the telescoping room engage and stop against the walls 16 of the main body, whereby said stop flanges will thereafter slide on the wall portions 16 at opposite sides of the opening 15 as will be later understood.

When the trailer is set up for living, an extension room section receiving, positioning and supporting member in the form of a removable track means, designated generally 18, is attached to the side of the main section of the trailer and below the opening 15 in the side wall 16 thereof so that the telescoping room section 14 may be run out on the track. As will later appear, the track means is vertically contractible and expansible, so that after the telescoping section has been run out to fully extended position, the track means may be lowered or contracted in the plane of the above opening 15 to lower the telescoping section and bring the floor level thereof even with the planar floor level of the main section of the trailer which planar floor extends inwardly from said opening 15 at right angles to the plane of said opening. Inside the main section of the trailer, the telescoping section travels and rests upon runners 21, 22 and 23 which are placed on the floor 24 in the main trailer section. The central runner 22 accommodates or provides a path for a central roller 25 mounted beneath the floor structure 26 of the telescoping section adjacent its inner edge. Runners 21 and 23 accommodate and provide a path over the floor for rollers 27 provided in the lower composite structural wall 26 of the telescoping section. Preferably, runner 23 is provided with a channel 28 to serve as a guide in maintaining rollers 27 upon the two runners 21, 23 and roller 25 upon runner 22.

The track means 18, which is detachably secured to brackets 30 provided on the main section of the trailer below the opening 15 as shown in FIGS. 3 and 4, is shown as comprising two track sections, each designated generally by numeral 32. One or more additional sections may be provided if the size and weight of the telescoping section warrants it. Each track section includes a lower base rail 34 comprised of a pair of angle sections 35 and 36 with spacer blocks 37 therebetween, the parts being welded or otherwise secured together. This base rail is provided with an attaching flange 38 at its inner end which carries one or more studs 39 for attachment to the bracket 30. The outer end of the base rail is mounted upon a pair of bolts 41 which are supported upon a concrete base 40 or other suitable support. Nuts 42 allow for vertical adjustment. Vertically above the base rail is a track rail, designated 44, which is constructed similarly to the base rail except that it is inverted and additionally is provided with a channel member 45 on its upper surface to form a track for the rollers 27 of the telescoping section. The track rail is also provided with a vertical depending guide rod 47 which is received in a guide opening 48 defined by the angle members 35 and 36 of the base rail and by spacer blocks 37'.

The base and track rails are connected by a lever system in the nature of a jack means. This includes a rod 50 and lever systems 51A and 51B. The system 51A comprises two levers 52 and 53 pivotally mounted at each side of the track rail upon pin 54 as well as two levers 56 and 57 pivotally mounted on each side of the base rail upon a pin 58. The levers 52 and 56 are pivotally mounted upon a collar 60 which is rotatable relative to rod 50 but held against axial movement with respect thereto by collars 61 which are welded or otherwise fixed to the rod. Levers 53 and 57 are pivotally connected to a threaded collar 62 which receives a threaded portion 64 of rod 50. Thus, with the construction described, rotation of the rod 50 in one direction serves to raise track rail 44 while rotation in the opposite direction serves to lower it. The rod is shown with a cross pin 65 near its outer end for the attachment of a crank (not shown).

The lever system 51B may consist merely of two sets of levers 52 and 56 pivotally mounted on a collar 60 such as previously described without levers 53 and 57 threaded collar 62, or the system 51B may be identical to system 51A.

Preferably, the track sections are braced by tie bars 66 and diagonal bracing bars 67.

In the operation, assuming the telescoping section 14 to be retracted inside the section 16 of the trailer, the track means 18 is attached and elevated to bring the track rail level with the runners 21, 22 and 23 on the floor 24 of the main section of the trailer. The telescoping section 14 is then run out to fully extended position where the floor 26 thereof is still maintained level and parallel with the planar floor 24 of the main trailer body section 12 as shown in FIGS. 3 and 4 onto the track means and this may be done manually or by means of a winch (not shown). In this fully extended and supported position of the room section 14 the vertical stop flanges 82 and 83 at each rear side of said room section are brought into vertical slidable engagement with the inner sides of the opening 15, as designated at 16 in FIGS. 2 and 6. After the telescoping section has been fully extended, the track rails are lowered from the position of FIG. 4 to that of FIG. 3 so as to lower the telescoping section of the trailer to floor level alignment with the main section of the trailer. When the telescoping section is thus lowered, it is retained in outer position by the engagement of the inner edge 70 of the floor structure with the sloping adjacent and joining outer marginal edge 71 of the main section of the trailer. Also the inner ends of the track rails rest in notches 73 at the side of the main trailer section which provide a firm support for the rails.

In order to provide a weather seal at the inner top section of the telescoping section when the section is extended, I provide a hinged plate 74 which is raised to the position of FIG. 3 from that of FIG. 4 to overlap a depending edge strip 75 of the roof 76 of the main section of the trailer. Plate 74 includes a portion 77 which fits between overhead strip 75 and an inclined strip 78 on the top of the roof 79 of the telescoping section. Weatherstrip 80, 81 of sheet metal or the like is provided on the outer surface. When the telescoping section is retracted inside the main section of the trailer, the plate 74 is turned down as shown in FIG. 4 and the weather-stripping 80, 81, seals the opening across the top of the telescoping section.

Along each side wall of the telescoping section I provide a pair of V-shape weatherstrips 84A and 84B, one of which is located near the outer wall 85 of the section and the other near the innermost portion of the side wall. In conjunction with these, I provide a removable weatherstrip 86 upon the trailer main section which can be placed as shown in FIG. 6, when the telescoping section is extended and which may be removed and similarly associated, upon replacement, with the outer strip 84A when the telescoping section is retracted. An inner weatherstrip 87 is fixed in place behind member 86.

While I have shown a particular type of lever jack means incorporated in the track sections, I contemplated that screw jacks or other types of mechanical jacks might be used in place thereof and that the track rails might be raised electrically as by fluid jacks, or by a combination of mechanical, fluid or electrical means.

I claim:

1. In an expansible house trailer, a main section having a floor, upright walls and a ceiling roof and having an opening in one upright wall extending upwardly from the floor, a telescoping room section having a floor, upright walls and a ceiling roof, said telescoping room section being received within said main trailer section and resting upon the floor thereof with the floor of the telescoping room section elevated above the floor of the main section, track means for supporting said telescoping room section in an extended position such that its floor is level with and forms a planar continuation of the floor of the main section and for also supporting the room section during movement thereof to and from said position, said track means comprising at least a pair of laterally spaced base rails detachably secured to said main section beneath said opening and extending outwardly of said main section and for a substantial distance, means supporting said base rails at their outer end portions on the ground, lateral brace means connecting said base rails, a track rail spaced above each base rail, and means engageable with and mounted between said base and track rails for supporting and for bodily raising and lowering said track rails relative to the main section to vertically move the room section when supported on the track rail.

2. In an expansible house trailer, a main section having a floor, upright walls and a ceiling roof and having an opening in one upright wall extending upwardly from the floor, a telescoping room section having a floor, upright walls and a ceiling roof, said telescoping room section being received within said main trailer section and resting upon the floor thereof with the floor of the telescoping room section elevated above the floor of the main section, track means for supporting said telescoping room section in an extended position such that its floor is level with and forms a planar continuation of the floor of the main section and for also supporting the room section during movement thereof to and from said position, said track means comprising at least a pair of laterally spaced base rails detachably secured to said main section beneath said opening and extending outwardly of said main section and for a substantial distance, means supporting said base rails at their outer end portions on the ground, lateral brace means connecting said base rails, a track rail spaced above each base rail, means engageable with and mounted between said base and track rails for supporting and for bodily raising and lowering said track rails relative to the main section to vertically move the room section when supported on the track rail, and guide means carried by said main section and engageable by the inner end portion of said track rails for maintaining said track rails in alignment above said base rails.

3. An expansible house trailer comprising a main section having a floor and at least one upright wall having an opening therein extending upwardly from the floor, a telescoping room section having a floor mounted on wheels on said main section floor for parallel supporting relationship therebetween, track rail means on the floor of the main section for supporting and guiding engagement with said room section, track rail extension means mounted adjacent the track rail means of the main section to form a coplanar continuation thereof whereby to support the room section as it is moved from the telescoped position in the main section through the opening in said wall to an extended parallel position on the outer side thereof, and means for lowering the track rail extension means to bring the room section floor coplanar with the main section floor.

References Cited by the Examiner

UNITED STATES PATENTS

| | | | |
|---|---|---|---|
| 845,464 | 2/07 | Hotaling | 254—122 X |
| 2,467,657 | 4/49 | Brown | 254—122 |
| 2,508,934 | 5/50 | Berg | 254—122 |
| 2,581,192 | 1/52 | La Fleur | 20—2 |
| 2,587,094 | 2/52 | Berg | 254—122 X |
| 2,775,355 | 12/56 | Leitner. | |
| 2,813,747 | 11/57 | Rice | 20—2 |
| 2,950,690 | 8/60 | Bohlen | 20—2 X |

JACOB L. NACKENOFF, *Primary Examiner.*

WILLIAM I. MUSHAKE, *Examiner.*